(12) United States Patent
Matsubara et al.

(10) Patent No.: US 9,889,763 B2
(45) Date of Patent: Feb. 13, 2018

(54) EXTERNAL POWER SUPPLY OF FUEL CELL MOUNTED VEHICLE AND CONTROL METHOD THEREFOR

(71) Applicant: TOYOTA JIDOSHA KABUSHIKI KAISHA, Toyota-shi, Aichi-ken (JP)

(72) Inventors: Yasuo Matsubara, Anjo (JP); Kenji Umayahara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 361 days.

(21) Appl. No.: 14/883,909

(22) Filed: Oct. 15, 2015

(65) Prior Publication Data
US 2016/0114690 A1 Apr. 28, 2016

(30) Foreign Application Priority Data
Oct. 27, 2014 (JP) .................. 2014-218334

(51) Int. Cl.
*B60L 11/18* (2006.01)
*B60L 1/00* (2006.01)

(52) U.S. Cl.
CPC ........... *B60L 11/1861* (2013.01); *B60L 1/003* (2013.01); *B60L 11/1842* (2013.01); *B60L 11/1862* (2013.01); *B60L 11/1881* (2013.01); *B60L 11/1887* (2013.01); *Y02T 10/705* (2013.01); *Y02T 10/7044* (2013.01); *Y02T 90/34* (2013.01)

(58) Field of Classification Search
CPC .............. B60L 11/1881; B60L 11/1861; B60L 11/1862; B60L 11/1887; B60L 11/1842; B60L 11/1898; Y02T 90/34; Y02T 10/7044; H01M 2250/20; Y02E 60/721; Y04S 10/126

See application file for complete search history.

(56) References Cited

U.S. PATENT DOCUMENTS

| 2010/0273080 A1 | 10/2010 | Noguchi et al. |
| 2011/0064976 A1 | 3/2011 | Shimoda |
| 2013/0245871 A1 | 9/2013 | Shirasaka et al. |
| 2014/0303821 A1 | 10/2014 | Oda |
| 2016/0190619 A1* | 6/2016 | Kazuno ............. H01M 8/04888 429/428 |

FOREIGN PATENT DOCUMENTS

| CN | 103318042 A | 9/2013 |
| JP | 2013-093941 | 5/2013 |
| JP | 2013-198292 | 9/2013 |

* cited by examiner

*Primary Examiner* — Ryan Johnson
(74) *Attorney, Agent, or Firm* — Finnegan, Henderson, Farabow, Garrett & Dunner, LLP

(57) ABSTRACT

There is provided a control method of an external power supply system configured to supply power to the outside from a fuel cell and a secondary battery mounted on a vehicle. When a failure is detected in a sensor that measures an electric power supplied to the outside from an electric power line to which the fuel cell and the secondary battery are connectable, (a) if a decrease in a state of charge of the secondary battery is detected, external power supply is performed by increasing a generated power of the fuel cell so as to stop the decrease in the state of charge, and (b) if an increase in a state of charge of the secondary battery is detected, external power supply is performed by decreasing the generated power of the fuel cell so as to stop the increase in the state of charge.

8 Claims, 8 Drawing Sheets

Fig.8
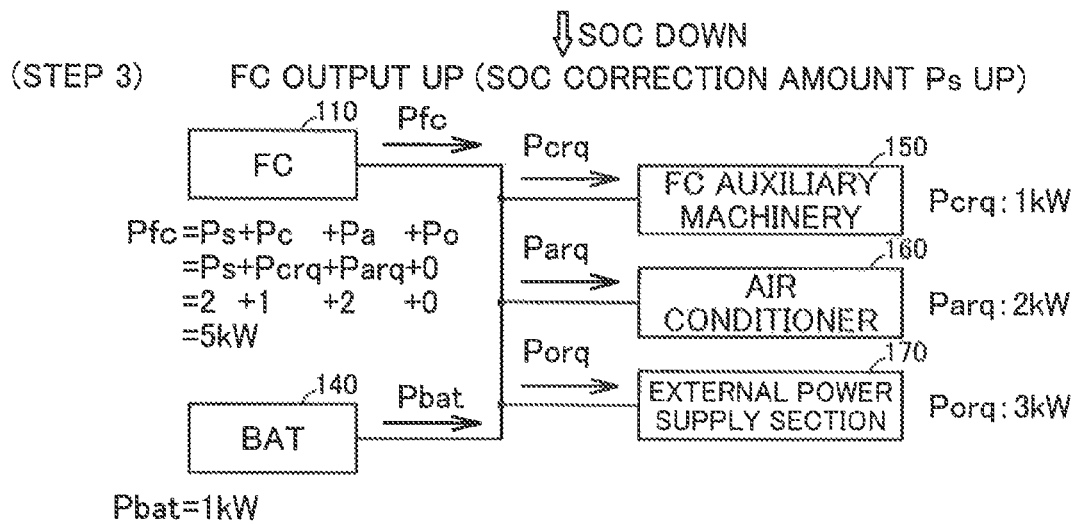
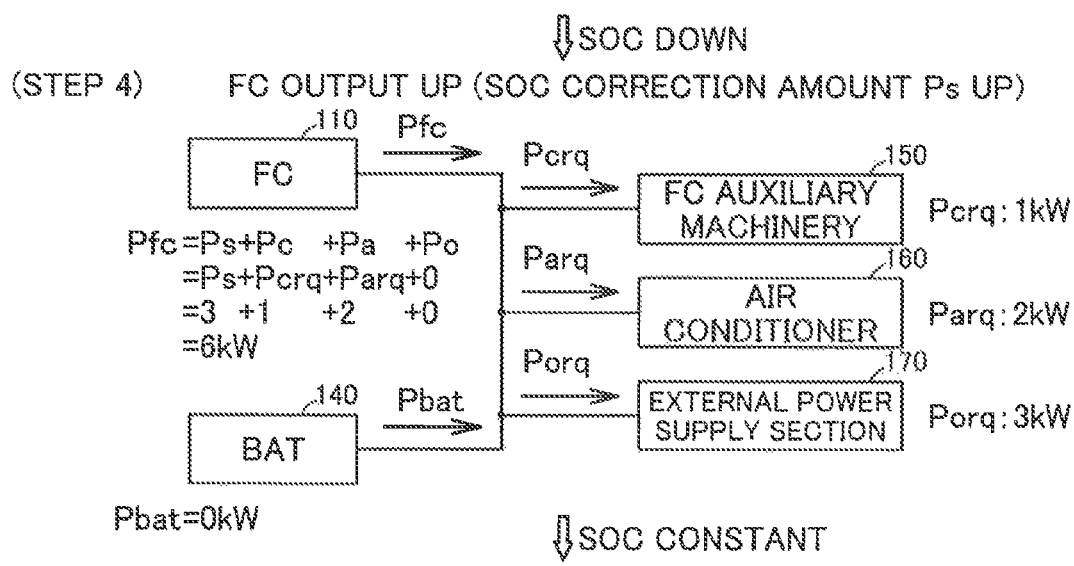

EXTERNAL POWER SUPPLY OF FUEL CELL MOUNTED VEHICLE AND CONTROL METHOD THEREFOR

CROSS REFERENCE TO RELATED APPLICATIONS

The present application claims the priority based on the Japanese Patent Application No. 2014-21.8334 filed on Oct. 27, 2014, the disclosure of which is incorporated by reference herein in its entirety.

BACKGROUND

Field

The present invention relates to an external power supply system that supplies electric power to the outside by using a fuel cell and secondary battery mounted on a vehicle.

Related Art

Conventionally, there have been proposed external power supply systems that supply electric power to outside a vehicle by using a fuel cell and secondary battery mounted on the vehicle (for example, JP2013-198292A, JP2013-93941A).

In JP2013-198292A, if a failure occurs in an external power supply circuit connected to a vehicle (Fuel Cell Vehicle), the power supply from a high-pressure battery of the power circuit of the fuel cell vehicle to the external power supply circuit is stopped. Thus, the immediate stoppage of power supply due to a failure that has occurred in a part of a system was a problem because of insufficient ease of use for the user.

Moreover, in JP2013-93941A, the supply of power to the outside through an electrical discharge from a secondary battery is assumed, and in order to ensure that the state of charge (SOC) of the secondary battery is within a predetermined range, charging of the secondary battery is performed by the power generation of the fuel cell. Therefore, charging or discharging of the secondary battery occurs frequently, and variation in SOC occurs frequently, because of which the possibility of degradation of the secondary battery is high, and there is insufficient improvement in the life of the secondary battery, thus causing a problem.

SUMMARY

The present invention has been realized to resolve at least part of the above-described problems, and may be implemented in the aspects described below.

(1) According to a first aspect, there is provided a control method of an external power supply system configured to supply power to the outside from a fuel cell and a secondary battery mounted on a vehicle. When a failure is detected in a sensor that measures an electric power supplied to the outside from an electric power line to which the fuel cell and the secondary battery are connectable, (a) if a decrease in a state of charge of the secondary battery is detected, external power supply is performed by increasing a generated power of the fuel cell so as to stop the decrease in the state of charge, and (b) if an increase in a state of charge of the secondary battery is detected, external power supply is performed by decreasing the generated power of the fuel cell so as to stop the increase in the state of charge.

According to the control method, even if there is a failure in the sensor that measures the electric power supplied to the outside, by controlling the power generation of the fuel cell in a way that the state of charge of the secondary battery does not vary, the electric power to the outside will be supplied from the fuel cell, and the supply of power to the outside will be maintained. Thus, the ease of use of the user will be improved. Moreover, since the variation in the state of charge of the secondary battery will be controlled by using a fuel cell as an external power supply, the life of the secondary battery will be improved.

(2) In the above control method, when a failure is detected in the sensor, either the above (a) or (b) may executed while assuming a part of the generated power of the fuel cell used for supplying power to the outside to be zero.

According to the control method, if a failure is detected in a sensor, then by assuming that an amount of power by the fuel cell corresponding to the power detected by the sensor with low reliability is zero, thus stopping the supply of power with low reliability, and then controlling the power generation of the fuel cell in a way that the state of charge of the secondary battery does not vary. As a result, the electric power supplied to the outside will be supplied from the fuel cell, and the supply of power to the outside will be maintained.

(3) In the above control method, the generated power of the fuel cell may be set as a total of an amount of generated power for supplying power to the outside, an in-vehicle device consumption amount that is consumed by in-vehicle devices, and a correction amount corresponding to the increase or decrease in the state of charge.

According to the control method, by increasing or decreasing the power generation of the fuel cell based on a correction amount depending on the increase or decrease of the state of charge, the increase or decrease in the state of charge of the secondary battery will be stopped.

(4) In the above control method, the power supplied to the outside when a failure is detected in the sensor may be restricted to a value determined based on an upper-limit value of charging or discharging power permitted for the secondary battery.

According to the control Method, by controlling the charging or discharging of the secondary battery, which occurs depending on the increase or decrease in the state of charge of the secondary battery, so that it does not exceed the upper-limit value of the amount of charging or discharging power permitted for the secondary battery, the state of charge of the secondary battery is maintained within the permissible range, and at the same time, the electric power supplied to the outside will be supplied from the fuel cell, and the supply of power to the outside will be maintained.

(5) According to another aspect, there is provided an external power supply system configured to supply power to the outside from a fuel cell and a secondary battery mounted on a vehicle. The external power supply system comprises; an external power supply section for supplying power to the outside from an electric power line to which the fuel cell and the secondary battery are connectable; a sensor for measuring power supplied to the outside via the external power supply section; a state-of-charge detector for detecting a value indicating a state of charge of the secondary battery; and a controller for controlling generation of power of the fuel cell and charging or discharging of the fuel eel When the controller detects a failure in the sensor, (a) if a decrease in a state of charge of the secondary battery is detected, the controller performs external power supply by increasing a generated power of the fuel cell so as to stop the decrease in the state of charge, and (b) if an increase in a state of charge of the secondary battery is detected, the controller performs external power supply by decreasing the generated power of the fuel cell so as to stop the increase in the state of charge.

According to the external power supply system, even if there is a failure in the sensor that measures the electric power supplied to the outside, by controlling the power generation of the fuel cell in a way that the state of charge of the secondary battery does not vary, the electric power to the outside will be supplied from the fuel cell, and the supply of power to the outside will be maintained. Thus, the ease of use of the user will be improved. Moreover, since the variation in the state of charge of the secondary battery will be controlled by using a fuel cell as an external power supply, the life of the secondary battery will be improved.

It should be noted that the present invention may be implemented in various forms, for example, in addition to a control method of an external power supply system that supplies power to the outside by using a fuel cell and a secondary battery mounted on a vehicle, the present invention may be implemented in forms such as a control method of a vehicle on which a fuel cell and a secondary battery are mounted, an external power supply system that supplies power to the outside by using a fuel cell and a secondary battery mounted on a vehicle, and a vehicle on which a fuel cell and a secondary battery are mounted.

BRIEF DESCRIPTION OF DRAWINGS

FIG. 8 is an explanatory drawing showing a specific example of a state of external power supply in abnormal case.

DESCRIPTION OF THE EMBODIMENTS

Figure 1:
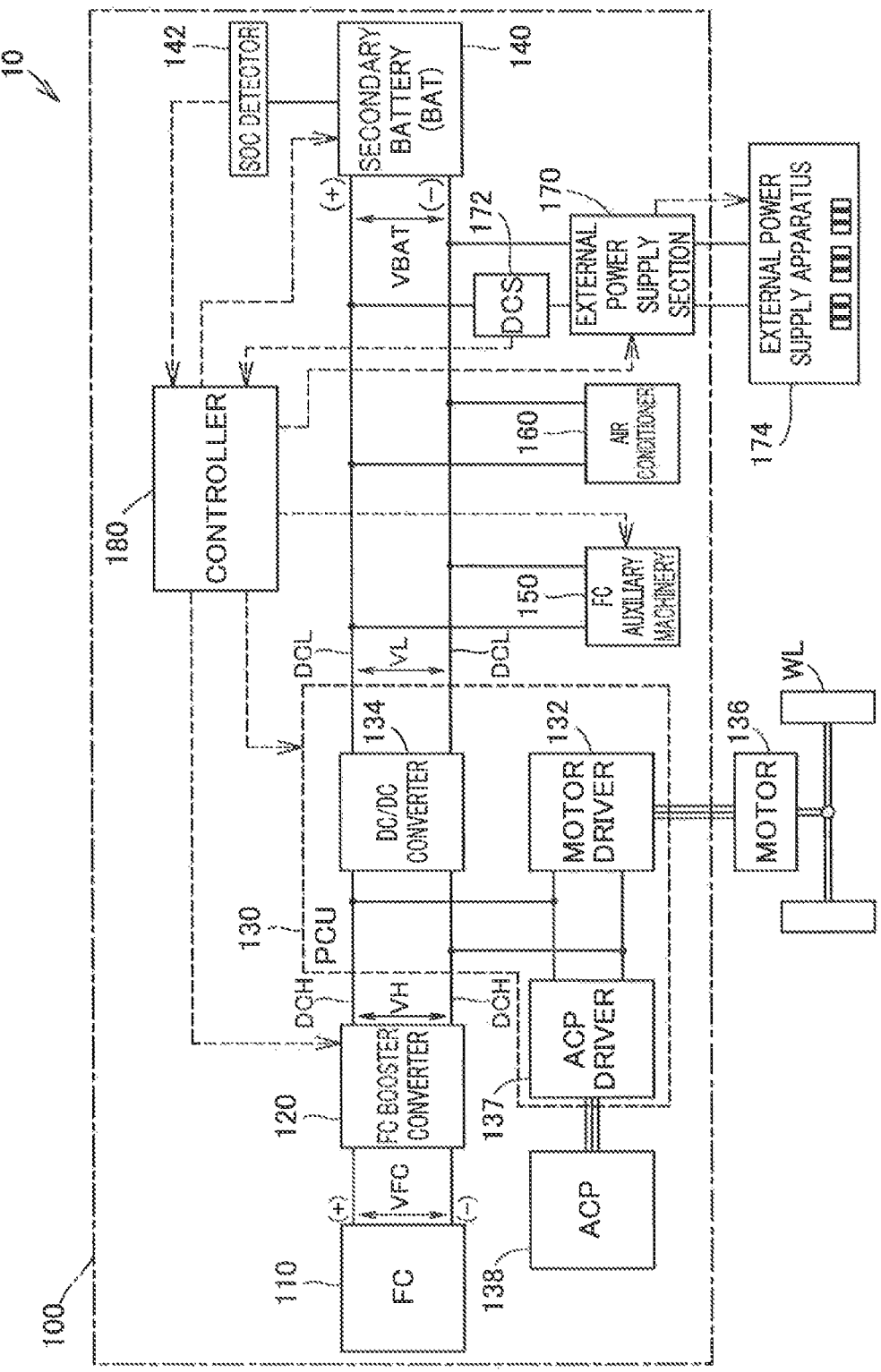
FIG. 1 is a schematic drawing showing a configuration of a fuel cell vehicle equipped with an external power supply system as a first embodiment of the present invention.

FIG. 1 is a schematic drawing showing a configuration of a fuel cell vehicle 10 equipped with an external power supply system 100 as a first embodiment of the present invention. The fuel cell vehicle 10 is equipped with a fuel cell (also abbreviated as "FC") 110 and a secondary battery (also abbreviated as "BAT") 140, and runs by using the electric power output by these as the drive power, The fuel cell vehicle 10 according to the present embodiment also functions as an external power supply system 100, and while the fuel cell vehicle 10 has been stopped, electric power can be supplied to an external load (not shown in the figure).

In the present specification, "while the fuel cell vehicle 10 has been stopped" implies a state when electric power is not supplied to the drive of a motor 136, which is described later, from the fuel cell 110 and the secondary battery 140. Moreover, it does not include the so-called idling state in which acceleration can be started due to the operation of the accelerator and shift change. It should be rioted that the state in which the movement of the fuel cell vehicle 10 is restricted in a fixed manner because of the braking mechanism of the parking brake (the so-called side brake) or the like is included in this state. On the other hand, "while the fuel cell vehicle 10 is running" implies a state when the motor 136 is driven by using the electric power of at least either one of the fuel cell 110 and the secondary battery 140. Moreover, this state includes the above-described idling state (excluding the state in which movement is restricted in a fixed manner because of the braking mechanism of the parking brake).

The fuel cell 110 is a polymer electrolyte fuel cell that generates power by receiving a supply of hydrogen and air (specifically, oxygen) as the reaction gases. The secondary battery 140 may be configured by a lithium ion battery, for example, it should be noted that the fuel cell 110 and the secondary battery 140 are not limited to a polymer electrolyte fuel cell and a lithium ion battery, and various other types of fuel cells and chargeable cells may be adopted.

The fuel cell vehicle 10 further includes an FC booster converter 120, a power control unit (also abbreviated as "PCU") 130, a motor 136, an air compressor (also abbreviated as "ACP") 138, an SOC detector 142, an FC auxiliary machinery 150, an air conditioning system (also abbreviated as an "air conditioner") 160, an external power supply section 170, a current sensor (also abbreviated as "DCS") 172, a controller 180, and wheels WL.

It should be noted that as equipment for power generation of the fuel cell 110, the fuel cell vehicle 10 is mounted with a reaction gas supply system and exhaust system, and a cooling medium supply system, and is also mounted with various devices for a vehicle, but those are not shown in drawings, and are also omitted from the explanation. However, devices such as the fuel pump and air compressor included. in the reaction gas supply system, and the cooling medium pump included in the cooling medium supply system (also called "auxiliary devices") are driven by using some of the power of the fuel cell 110 and the secondary battery 140, and are related to the external power supply control described later. Thus, of the auxiliary devices for FC, the fuel pump for fuel gas that operates by the electric power from the low-voltage DC line DCL described later, and the cooling medium pump for the cooling medium are combined together as one part and shown in the figure as FC auxiliary machinery 150, and the air compressor (ACP) 138 for the oxidizing gas that operates by the electric power from the high-voltage, DC line DCH described later is shown independently in the figure.

The controller 180 is configured by a micro-computer equipped with a CPU and a ROM and RAM. The controller 180 receives a switching operation via a operation mode selection switch (not shown in the figure) used by the driver, and switches the operation mode of the fuel cell vehicle 10. Here, the fuel cell vehicle 10 according to the present embodiment includes a "normal running mode" and an "external power supply mode" as the operation modes.

The "normal running mode" is a mode for running the fuel cell vehicle 10 based on the operation performed by the driver. When the normal running mode has been selected, the controller 180 receives an operation such as the accelerator operation performed by the driver, and depending on the operation details, controls the power generation of the fuel cell 110, and the charging or discharging of the secondary battery 140. On the other hand, the "external power supply mode" is a mode in which the fuel cell vehicle 10 is made to function as the external power supply system 100 that supplies electric power to an external load, in a state in which the fuel cell vehicle 10 has been stopped. The specific control contents in the external power supply mode will be described later.

The fuel cell 110 is connected to the high-voltage DC line DCH via the PC booster converter 120, and is connected to a motor driver 132 and ACP driver 137 included in the PCU 130 via the high-voltage DC line DCH. Moreover, the secondary battery 140 is connected to the DC/DC converter 134 included in the PCU 130 via the low-voltage DC line DCL, and the DC/DC converter 134 is connected to the high-voltage DC line DCH.

The FC booster converter 120 boosts the output voltage VFC of the fuel cell 110 to a high voltage VH that is usable in the motor driver 132 and the ACP driver 137.

The motor driver 132 is connected to the motor 136 that drives the wheels WL via a gear, etc. The motor 136 is configured by a synchronous motor equipped with three-phase coils. The motor driver 132 is configured by a three-phase inverter circuit, converts the output power of the fuel cell 110 supplied via the FC booster converter 120, as well as the output power of the secondary battery 140 supplied via the DC/DC converter 134 to three-phase AC power, and supplies it to the motor 136.

The ACP driver 137 is connected to the ACP 138. As is the case with the drive motor 136, the ACP 138 is driven by a synchronous motor equipped with three-phase coils. As is the case with the motor driver 132, the ACP driver 137 is configured by a three-phase inverter circuit, converts the output power of the fuel cell 110 supplied via the PC booster converter 120, as well as the output power of the secondary battery 140 supplied via the DC/DC converter 134 to three-phase AC power, and supplies it to the ACP 138. The ACP 138 supplies air to the fuel cell 110 according to the rotation of the motor that is driven depending on the supplied power.

In the normal running mode, the controller 180 generates and sends a drive signal according to the accelerator opening (amount of stepping on the accelerator pedal) to the motor driver 132 and the DC/DC converter 134, respectively. Depending on the drive signal of the controller 180, for example, by adjusting the pulse width of the three-phase AC voltage supplied to the motor 136, the motor driver 132 performs rotation of the motor 136 according to the accelerator opening. Thus, the fuel cell vehicle 10 is made to run.

The DC/DC converter 134 variably adjusts the voltage level of the high-voltage DC line DCH depending on the drive signal from the controller 180, and switches the charging/discharging status of the secondary battery 140. When the secondary battery 140 is in a state of discharging, the DC/DC converter 134 converts the output voltage VBAT of the secondary battery to a high voltage VH usable in the motor driver 132, and when the secondary battery 140 is in a state of charging, the DC/DC converter 134 converts the high voltage VH output from the FC booster converter 120 to a low voltage VL usable for charging the secondary battery 140. It should be noted that if regenerative electric power is generated in the motor 136, the regenerative electric power is converted to DC power by the motor driver 132, and is used for charging the secondary battery 140 via the DC/DC converter 134.

The SOC detector 142 detects the state of charge (SOC) of the secondary battery 140, and transmits it to the controller 180. It should be noted that in the present specification, the "State of Charge (SOC)" denotes a ratio of the currently remaining charge amount (state of charge) to the full charge capacity of the secondary battery 140. The SOC detector 142 detects the temperature, output voltage, or output current of the secondary battery 140, and thereafter, detects SOC based on these detected values. It should be noted that the SOC detector 142 is called the "state-of-charge detector".

The controller 180 acquires the SOC detected by the SOC detector 142, and then based on the acquired SOC, controls the charging or discharging of the secondary battery 140 so that the SOC of the secondary battery 140 is within a predetermined range. Hereinafter, in the present specification, the charge and discharge control of the secondary battery 140 based on the detected value of SOC by the controller 180 is called "SOC control". Before starting the SOC control, the controller 180 sets a SOC target value, which is used as a reference value for specifying a permissible range of SOC of the secondary battery 140. The SOC control in the normal running mode is the same as in the conventional art, and in the present embodiment, the SOC control in the external power supply mode has the characteristics described later.

The FC auxiliary machinery 150, the air conditioner 160, and the external power supply section 170 are respectively connected to the low voltage DC line DCL. As described above, the FC auxiliary machinery 150 includes auxiliary devices used for power generation from the fuel cell 110, such as the fuel pump and cooling medium pump, and the FC auxiliary machinery 150 is driven when power is supplied from the fuel cell 110 and the secondary battery 140. The air conditioner 160 is an air conditioning device for the fuel cell vehicle 10, and is similarly driven when power is supplied from the fuel cell 110 and the secondary battery 140. As explained below, the external power supply section 170 is a power supply device for supplying power to an external load, and is similarly driven when power is supplied from the fuel cell 110 and the secondary battery 140.

The external power supply section 170 is connectable to an external power supply apparatus 174 used for connecting an external load that is operated by AC power. By connecting the external power supply apparatus 174 to the external power supply section 170, the fuel cell vehicle 10 functions as the external power supply system 100, and enables the supply of electric power from the fuel cell 110 and the secondary battery 140 to the external load (not shown in the figure) connected to the external power supply apparatus 174. It should be noted that the external power supply section 170 according to the present embodiment has a circuit configuration by which the DC power from the low-voltage DC line DCL is supplied to the external power supply apparatus 174, and the external power supply apparatus 174 has a circuit configuration by which the DC power supplied from the external power supply section 170 is converted to an AC power of 100 VAC, thereby supplying the electric power to the external load connected to its electrical outlets suitable for commercial power supply.

The current sensor 172 is provided in the line that connects the external power supply section 170 and the low-voltage DC line DCL, and the amount of current supplied to the external power supply section 170 is measured by the current sensor 172.

The controller 180 is able to acquire the current value (measured value) measured by the current sensor 172, and to determine the electric power supplied to the external load via the external power supply section 170 and the external power apparatus 174, Therefore, the current sensor 172 corresponds to a sensor that measures the electric power supplied to the external load via the external power supply section 170 and the external power supply apparatus 174. It should be noted that the voltage VL of the low-voltage. DC line DCL (the output voltage VBAT of the secondary battery 140) may be measured by a voltage sensor, or may be stored in the controller 180 as a known voltage value.

It should be noted that the controller 180 may set the upper-limit value of the electric power that can be supplied to the external power supply apparatus 174 (also called the "permissible power output") via the external power supply section 170. The external power supply apparatus 174 may restrict the electric power supplied to the connected external load below the set upper-limit value.

According to the above-described configuration of the fuel cell vehicle 10, the fuel cell 110 is connected to the low-voltage DC line DCL, to which the secondary battery 140 and the external power supply section 170 are connected, via the FC boost converter 120, the high-voltage DC line DCH and the DC/DC converter 134. However, the fuel cell vehicle 10 is not restricted to the above configuration, and a switch may be provided between the output end of the fuel cell 110 (including the inside of the fuel cell) and the output end of the DC/DC converter 134 (including the outside of the DC/DC converter), and this switch may be used to connect or disconnect the fuel cell 110 from the low-voltage DC line DCL. Moreover, a switch may be provided at the output end of the secondary battery 140 (including the inside of the secondary battery), and this switch may be used to connect or disconnect the secondary battery 140 from the low-voltage DC line DCL. It should be noted that the low-voltage DC line DCL is also simply called a "power line".

The control operation of the fuel cell vehicle 10 in the normal running mode is the same as that of the well-known fuel cell vehicle, and therefore, its explanation has been omitted, and hereinafter, the control operation of the external power supply system 100 in the external power supply mode will be explained.

Figure 2:
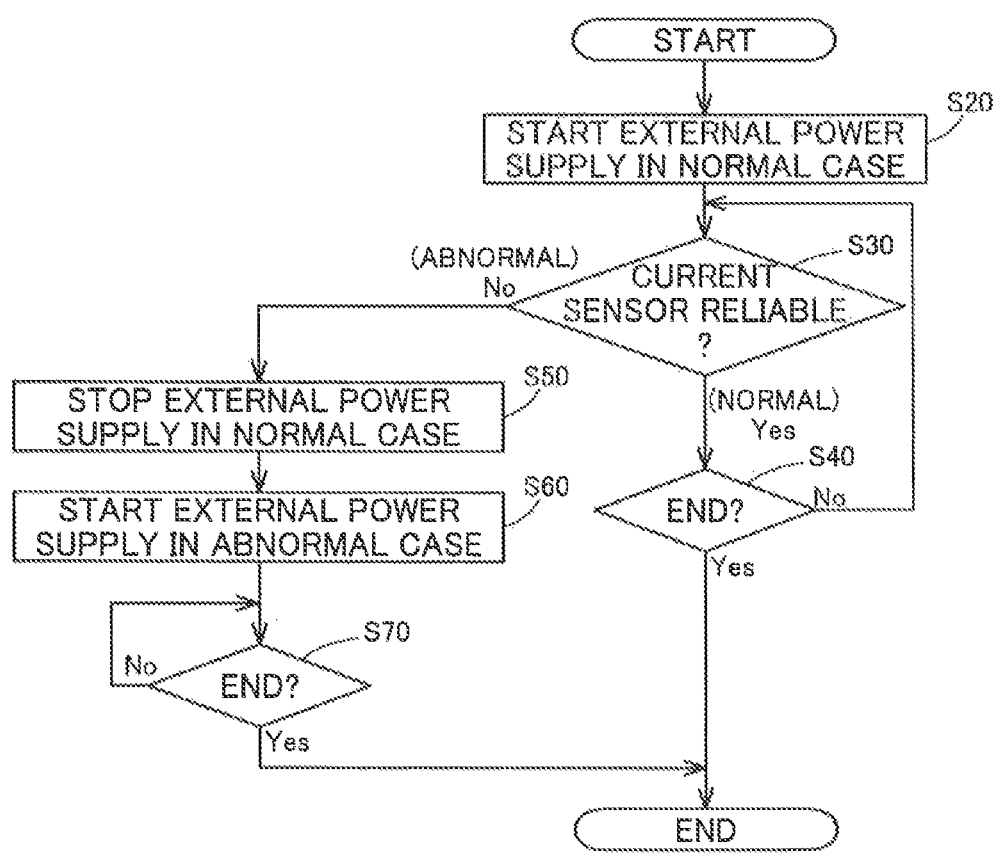
FIG. 2 is a flowchart showing a control procedure of an external power supply mode.

FIG. 2 is a flowchart showing a control procedure of the external power supply system 100 that is executed in the external power supply mode by the controller 180. In step S20, the controller 180 first of all starts the external power supply when the current sensor 172 is normal (also called the "external power supply in normal case"). Note that the operation of the external power supply in normal case is described later. Also, in step S30, reliability (existence of a failure) of the current sensor 172 is judged. If a failure occurs in the current sensor 172 due to a fault such as a disconnection fault or an earthing fault, or else an offset fault, the value indicated by the current sensor 172 (also called the "current measured value" or the "current sensor value") indicates an abnormal value depending on the fault status. Thus, it is possible to determine the reliability of the current sensor 172 based on existence of these failure states, and also to detect a failure of the current sensor 172.

If it is determined that the current sensor 172 is reliable (the current sensor 172 is normal), the controller 180 periodically repeats the reliability judgment of the current sensor 172 in step S30 until the operation of the external power supply mode ends, and at the same time, continues, in parallel, with the operation of the external power supply in normal case that was started in step S20. On the other hand, if it is determined that the current sensor 172 is not reliable (the current sensor 172 has a failure), the controller 180 ends the control of the external power supply in normal case in step S50, and in step S60, starts the external power supply for the case when the current sensor 172 has a failure or abnormality (also called the "external power supply in abnormal case"). Note that the operation of the external power supply in abnormal case is described later. The operation of the external power supply in abnormal case that was started in step S60 continues until the operation of the external power supply mode ends (step S70).

It should be noted that before the step S20 shown in FIG. 2, the same judgment as step S30 may be performed, and if the current sensor 172 is reliable, then the external power supply in normal case may be started in step S20, and if the current sensor 172 is not reliable, then the external power supply in abnormal case may be started in step S60.

Figure 3:
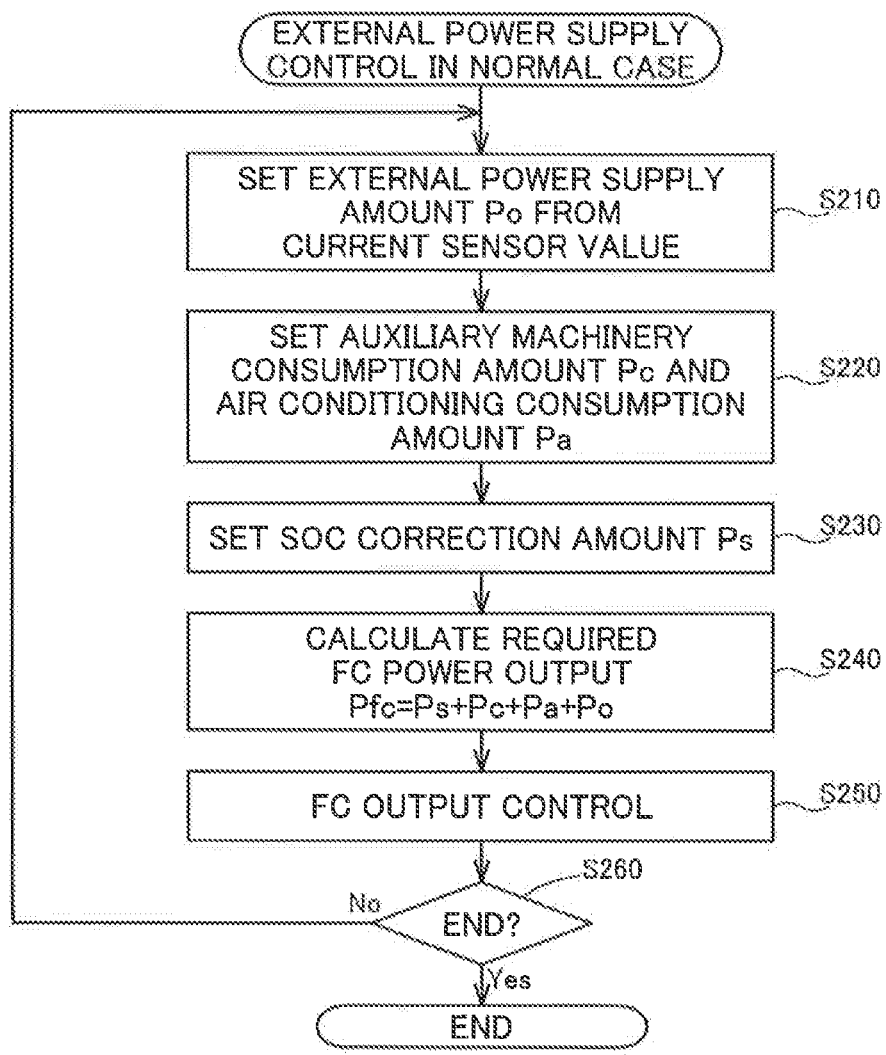
FIG. 3 is a flowchart showing a control procedure of external power supply in normal case.

FIG. 3 is a flowchart showing a control procedure of external power supply in normal case. In step S210, of the power output Pfc of the fuel cell 110 (also called the "generated power"), the controller 180 sets an amount of external power supply Po corresponding to the power required during the operation of the external load (hereinafter, also called the "external required power Porq") based on the value indicated by the current sensor 172 (the current sensor value Idsc). The external required power Porq is determined from the product of the current sensor value Rise. and the low voltage VL. In step S220, the controller 180 sets an auxiliary machinery consumption amount Pc corresponding to the electric power required for the operation of the ACP 138 and the FC auxiliary machinery 150 (hereinafter, also called the "auxiliary machinery required power Pcrq"), as well as an air conditioning consumption amount Pa corresponding to the electric power required for the operation of the air conditioner 160 (hereinafter, also called the "air conditioning required power Parq"). It should be noted that the auxiliary machinery required power Pcrq is determined from the operation status of the ACP 138 and the operation status of the PC auxiliary machinery 150, and the air conditioning required power Parq is determined from the operation status of the air conditioner 160. In step S230, the controller 180 sets an SOC correction amount Ps of the secondary battery 140. The SOC correction amount Ps is a generated power required for charging the secondary battery 140 in order to return the current value of SOC to its target value if the current value is lower than the target value. The setting of the SOC correction amount Ps is the same as the setting of the SOC correction amount Ps in the external power supply in abnormal case, which is described later, and therefore, the details are explained later in the external power supply in abnormal case. It should be noted that since the auxiliary machinery for the FC (the ACP 138 and the PC auxiliary machinery 150 and the air conditioner 160 are devices present in the fuel cell vehicle 10 that operate with the help of the power supplied from the external power supply system 100 in the external power supply mode, the power consumption amounts, that is, the auxiliary machinery consumption amount Pc and the air conditioning consumption amount Pa are also called the "in-vehicle device consumption amount".

Also note that in the present embodiment, the ACP 138, the PC auxiliary machinery 150, and the air conditioner 160 are the in-vehicle devices, but the invention is not restricted to these, and the air conditioner 160 may be omitted. Moreover, other devices may be included as the in-vehicle devices, and their consumption amount may be considered as the consumption amount of the in-vehicle devices.

Next in step S240, the controller 180 sums up the external power supply amount Po, the auxiliary machinery consumption amount Pc, the air conditioning consumption amount Pa, and the SOC correction amount Ps, calculates the power output required value that is required of the fuel cell 110, and sets it as the power output Pfc. Also, in step S250, the controller 180 controls the power generation conditions (the supply conditions of the reaction gases and cooling conditions) of the fuel cell 110, and controls the power generation of the fuel cell 110 so that the electric power corresponding to the set power output Pfc will be output.

It should be noted that the control operation of the fuel cell 110 in step S210 to step S250 during the above-described external power supply control in normal case is repeatedly executed until the end of the process during the above-described judgment of a failure in the current sensor 172 (step S50 of FIG. 2), or until an instruction is issued to end the external power supply mode (step S200).

As described above, during the external power supply in normal case that. is performed when the current sensor 172 is normal, specifically, the SOC of the secondary battery 140 maintains the SOC target value, and rather than consuming the electricity stored in the secondary battery 140, the required electric power is covered by the power generated by the fuel cell 110. However, if the SOC is higher than the SOC target value, the electricity stored in the secondary battery 140 may be consumed.

Figure 4:
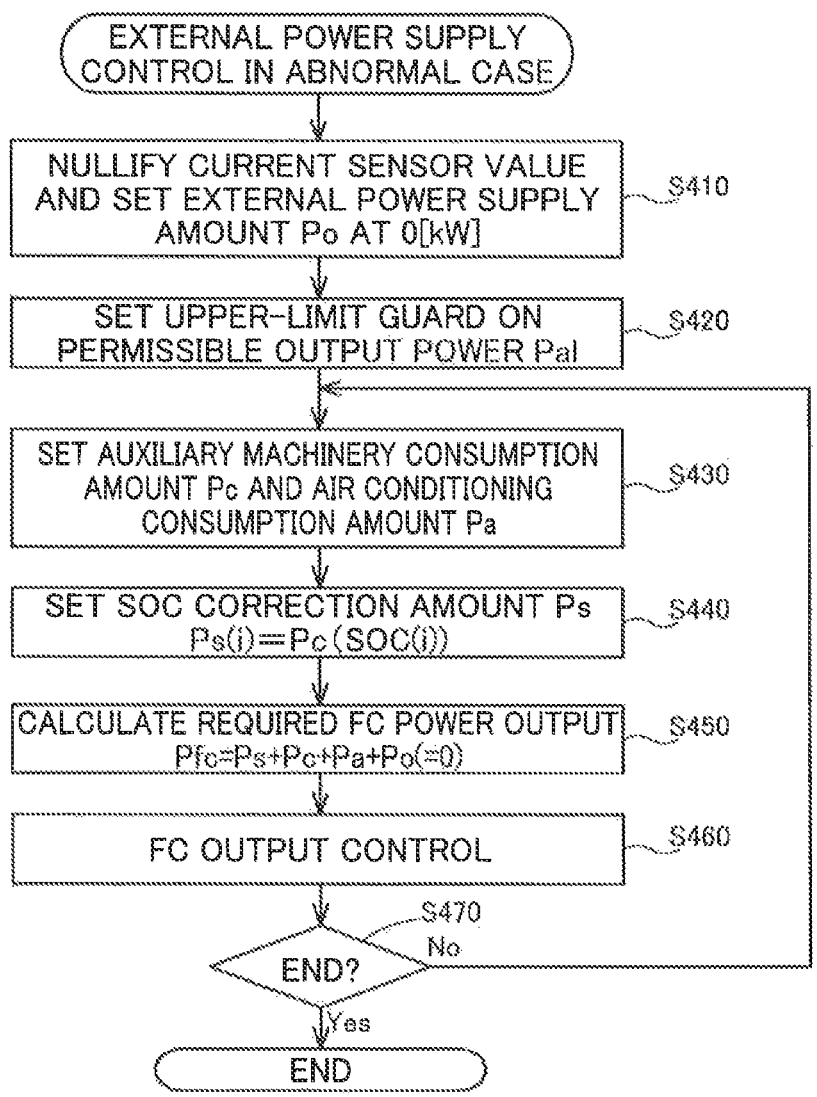
FIG. 4 is a flowchart showing a control procedure of external power supply in abnormal case.

FIG. 4 is a flowchart showing a control procedure of external power supply in abnormal case. In step S410, the controller 180 nullifies the current sensor value Idsc (Idsc=0), and sets the external power supply amount Po of the power output Pfc of the fuel cell 110 to 0 kW. In other words, the external power supply amount Po is assumed to be zero. In such a case, if the SOC of the secondary battery 140 maintains the SOC target value during the above-described external power supply in normal case, the SOC correction amount Ps also becomes 0 kW, and therefore, the power output Pfc of the fuel cell 110 is only the electric power corresponding to the consumption amount Pc+Pa of the in-vehicle devices (sum of the auxiliary machinery consumption amount Pc and the air conditioning consumption amount Pa). Thus, the electric power corresponding to the external power supply amount Po is covered by the secondary battery 140 rather than the fuel cell 110.

In step S420, the controller 180 sets an upper-limit value Pul in the electric power Pal that is permitted to be supplied outside (the permissible power output), and applies an upper-limit guard. The upper-limit value Pul is set in the external power supply apparatus 174 via the external power supply section 170, and the supply of electric power from the external power supply apparatus 174 to the external load is restricted below the upper limit value Pul. Thus, the SOC of the secondary battery 140 will be restricted so that it does not fall below the lower-limit value of the permissible range of the SOC of the secondary battery 140 due to the power supplied to the outside from the secondary battery 140, which is described later. It should be noted that the upper-limit value Pul of the permissible power output Pal is decided as a value obtained by multiplying the safety coefficient with the maximum value that can be set for the SOC correction amount Ps while considering a limitation concerning the charge capacity (electric power) and a limitation concerning the discharge capacity (electric power) of the secondary battery 140 that changes depending on the temperature conditions. The permissible power output Pal during the external power supply in normal case is restricted below 10 kW, for example. In contrast, the upper-limit value Pul of the permissible power output Pal during the external power supply in abnormal case is restricted to be a value between about 3 kW and 6 kW, for example, which is a value lower than in the normal case.

In step S430, the controller 180 sets the auxiliary machinery consumption amount Pc corresponding to the auxiliary machinery required power Pcrq that is required for the operation of the ACP 138 and the FC auxiliary machinery 150, as well as the air conditioning consumption amount Pa corresponding to the air conditioning required power Parq of the air conditioner 160. It should be noted that same as step S220 of FIG. 3, the auxiliary machinery required power Pug is determined from the operation status of the ACP 18 and the FC auxiliary machinery 150, and same as step S220 of FIG. 3, the air conditioning required power Parq is determined from the operation status of the air conditioner 160.

Also, in step S440, the controller 180 acquires a current SOC value SOC(i) with the SOC detector 142, and acquires the correction amount PS(i) corresponding to the acquired SOC value SOC(i) as shown in the formula below, on the basis of an SOC correction map prepared beforehand.

$$Ps(i) Pc(SOC(i)) \quad (1)$$

where Pc(SOC) expresses the characteristics of the SOC correction map showing the relationship between the SOC and the SOC correction amount Ps in the expression form of a function, and Pc(SOC(i)) denotes a value of the SOC correction amount Ps(i) that is derived from the SOC correction map corresponding to the acquired current SOC value SOC(i).

Figure 5:
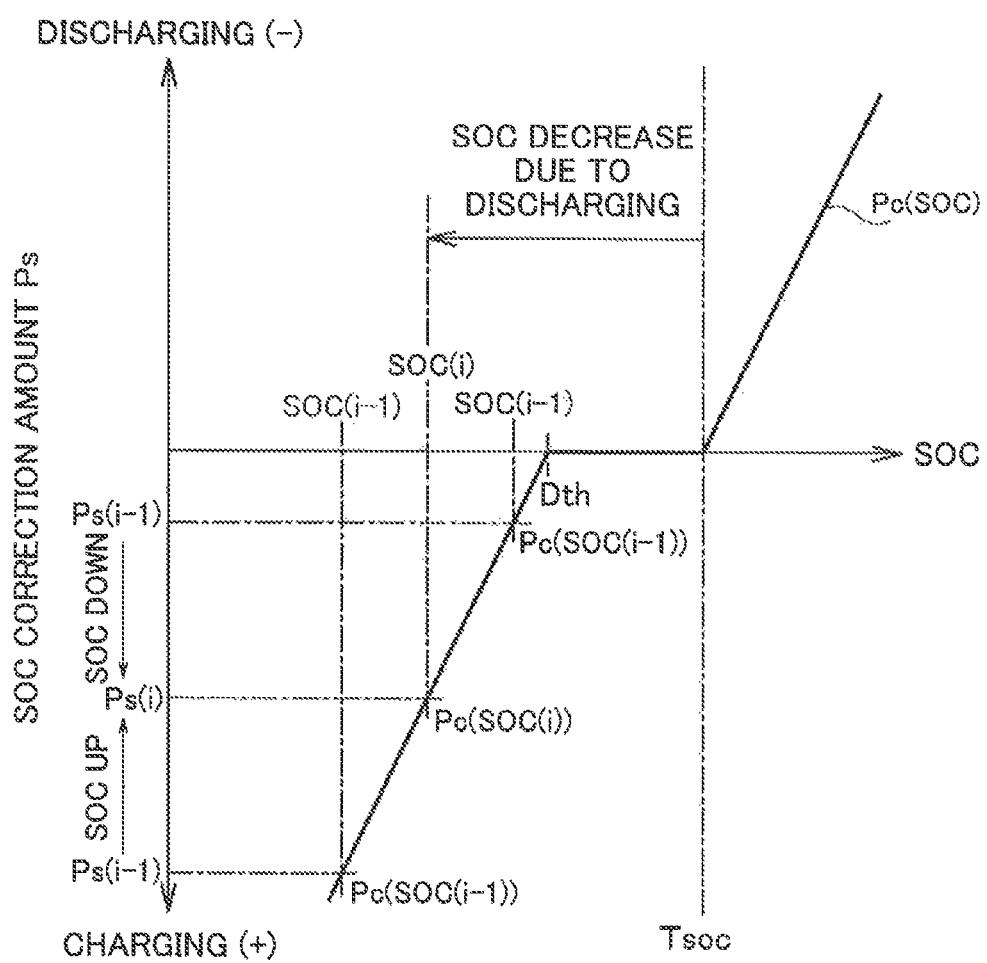
FIG. 5 is an explanatory drawing showing an example of an SOC correction map representing the relationship between SOC and SOC correction amount.

FIG. 5 is an explanatory drawing showing an example of an SOC correction map representing the relationship between the SOC and the SOC correction amount. According to the characteristic of the SOC correction map Pc(SOC), as for an SOC that is above the SOC target value Tsoc (60% in the present example), the SOC correction amount Ps is set to increase at the discharging side as the SOC increases. Further, among the SOCs that are below the SOC target value Tsoc, in the SOC range from the SOC target value Tsoc down to the lower-limit threshold value Dth (58% in the present example), the SOC correction amount Ps is set to 0. Moreover, in the SOC range that is below the lower-limit threshold value Dth, the SOC correction amount Ps is set to increase at the charging side as the SOC decreases. It should be noted that the SOC target value Tsoc can be set to any arbitrary value in view of the occurrence state of charging or discharging within the permissible usable range of the secondary battery 140.

The reason why the SOC correction amount Ps is set to 0 in the SOC range from the SOC target value Tsoc to the lower-limit threshold value Dth is because this range is the range of SOC that can be recovered through charging control of the secondary battery 140 that is executed independently. During the control performed in the present embodiment, by setting the SOC correction amount Ps that is within this SOC range to 0, the unnecessary fuel consumption due to the power generation of the fuel cell 110 will be reduced. However, if this point is not taken into consideration, there is no need of surely providing such an insensitive area (the range from the SOC target value Tsoc down to the lower-limit threshold value Dth), and simply, for an SOC that is below the SOC target value Tsoc, the SOC correction amount Ps may be set to increase at the charging side as the SOC decreases.

If the current SOC value SOC(i) is within the range from the SOC target value Tsoc down to the lower-limit threshold value Dth, then in step S440, based on the SOC correction map of FIG. 5, a fixed Ps(SOC(i)), that is, "0" is acquired as the SOC correction amount Ps (i), regardless of the SOC value SOC(i).

If the current SOC value SOC(i) is below the lower-limit threshold value Dth, then based on the SOC correction map of FIG. 5, a positive value Ps(SOC(i)) at the charging side is acquired as the SOC correction amount Ps(i) depending on the difference between the SOC target value Tsoc and the current SOC value SOC(i)). Here, as shown in FIG. 5, if the current SOC value SOC(i) is lower than the SOC value SOC(i-1) acquired in the previous cycle, then an even larger positive value Ps(SOC(i)) than the previous value Ps(SOC (i-1)) is acquired as the SOC correction amount Ps(i). This corresponds to detection of a drop in SOC. In such a case, the positive SOC correction amount that is further away in the charging direction than the SOC correction amount in the previous cycle is seen to increase. Moreover, as shown in FIG. 5, if the acquired SOC value SOC(i) is lower than the lower-limit threshold value Dth, but higher than the SOC value SOC(i-1) acquired in the previous cycle, then a positive value Ps(SOC(i)) that is smaller than the previous value Ps(SOC(i-1)) is acquired as the SOC correction amount Ps(i). This corresponds to detection of an increase in SOC. This SOC correction amount Ps(i) is also a positive SOC correction amount in the charging direction.

As is the case with a drop in SOC, if the current SOC value SOC(i) is higher than the SOC target value Tsoc, then based on the SOC correction map of FIG. 5, a negative value Ps(SOC(i)) at the discharging side is acquired as the SOC correction amount Ps(i) depending on the amount of difference between the SOC target value Tsoc and the current SOC value SOC(i). Also, the negative SOC correction amount in the discharge direction fluctuates depending on the rise or drop of the SOC from the SOC value SOC(i-1) in the previous cycle.

Next, in step S450, the controller 180 sums up the auxiliary machinery consumption amount Pc, the air conditioning consumption amount Pa, and the SOC correction amount Ps, calculates the power output required value that is required of the fuel cell 110, and sets it as the power output Pfc. Also, in step S460, the controller 180 controls the power generation conditions (the supply conditions of the reaction gases and cooling conditions) of the fuel cell 110, and controls the power generation of the fuel cell 110 so that the electric power corresponding to the set power output Pfc will be output.

It should be noted that the control operation of the fuel cell 110 in step S430 to step S460 during the above-described external power supply control in abnormal case is repeatedly executed until an instruction is received to end the above-described external power supply mode (step S470).

During the control operation of the above-described external power supply in abnormal case, the SOC correction amount Ps is set to increase in the charging direction so as to stop the drop in SOC when SOC drops, and the electric power corresponding to this increased amount is generated by the fuel cell 110 and output. Also, by repeatedly executing this operation, an SOC correction amount Ps that can stop the drop in the SOC while performing external power supply is set, and power will be generated by the fuel cell 110 in accordance. Thus, even when a failure occurs in the current sensor 172, it is possible to continue the external power supply. Also, in such a balanced state, if the SOC rises, the SOC correction amount Ps is set to decrease so as to stop the rise in SOC, and the generation of power by the fuel cell 110 is reduced in accordance with this reduced amount. Moreover, by repeatedly executing this operation, an FC output required value Pfc that can stop the rise and drop in the SOC that is balanced with the amount of external power supply is set, and power can be generated by the fuel cell 110 in accordance.

Figure 6:
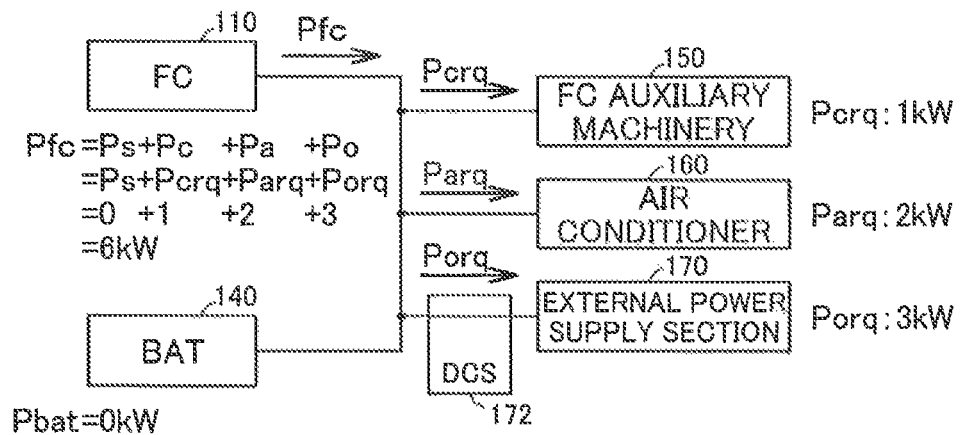
FIG. 6 is an explanatory drawing showing a specific example of a state of external power supply in normal case.
Figure 7:
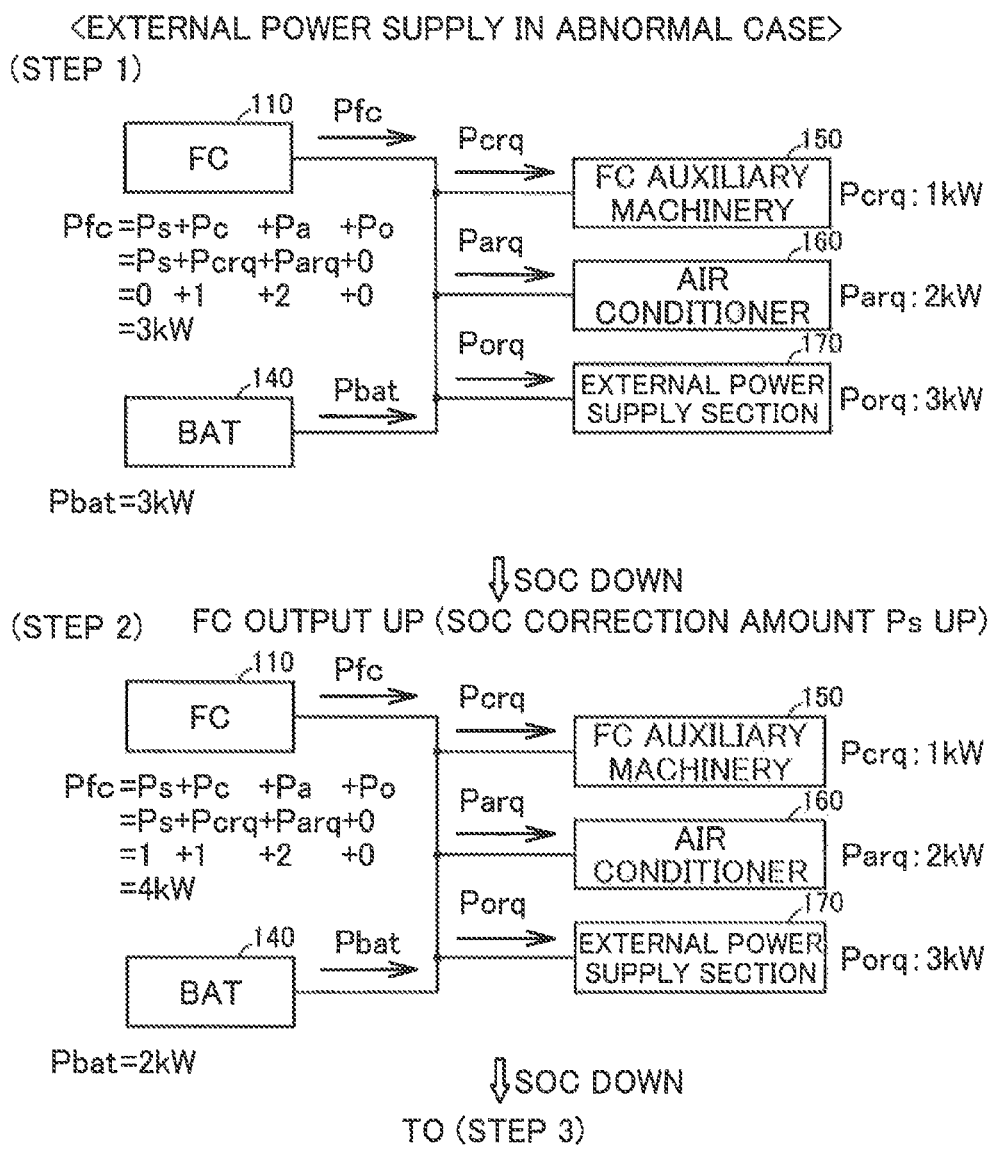
FIG. 7 is an explanatory drawing showing a specific example of a state of external power supply in abnormal case.

Hereinafter, a specific example of the control operation of the external power supply in normal case and the external power supply in abnormal case will be described. FIG. 6 is an explanatory drawing showing a specific example of the external power supply in normal case. FIG. 7 and FIG. 8 are explanatory drawings showing a specific example of the external power supply state in abnormal case that is started from the external power supply state in normal case shown in FIG. 6.

As shown in FIG. 6, during the external power supply in normal case immediately before the start of the external power supply in abnormal case, where the auxiliary machinery required power Pcrq is 1 kW which is the total value of the required power of the ACP 138 and the FC auxiliary machinery 150, the air conditioning required power Parq of the air conditioner 160 is 2 kW, and the external required power Porq of the external power supply section 170 is 3 kW; in response to these requirements, the total value of 6 kW is output from the fuel cell 110 as the power output Pfc of the fuel cell 110 of the auxiliary machinery consumption amount Pc is 1 kW, the air conditioning consumption amount Pa is 2 kW, and the external power supply amount Po is 3 kW. In such a case, the SOC of the secondary battery 140 is not consumed, and the SOC retains the SOC target value Tsoc.

During the operation performed in the state shown in FIG. 6, if a failure occurs in the current sensor 172, first of all, as shown in step 1 of FIG. 7, the external power supply amount Po of the power output Pfc of the fuel 110 is assumed to be 0 kW (see step S410 of FIG. 4), and the power output Pfc of the fuel cell 110 becomes 3 kW accordingly. Therefore, the insufficient amount of the external required power Porq of 3 kW is covered by the output Pbat of 3 kW of the secondary battery 140. As a result, the SOC of the secondary battery 140 is consumed, and the SOC drops.

If the SOC drops, the SOC correction amount Ps increases (see step 5440 of FIG. 4, and FIG. 5), and the power output Pfc of the fuel cell 110 increases so as to stop the drop in the SOC (see steps S450 and S460 of FIG. 4), For example, as shown in step 2 of FIG. 7, the SOC correction amount Ps increases from 0 kW in step 1 to 1 kW, and a total power output Pfc of 4 kW of the fuel cell 110 is output. Here, 1 kW of the external required power Porq (3 kW) is covered by the power output Pfc of the fuel cell 110, but a power of 2 kW is still insufficient. Therefore, the insufficient 2 kW of power is covered by the output Pbat of 2 kW of the secondary battery 140. Therefore, in the state of step 2 as well, the consumption of the SOC of the secondary battery 140 does not stop, and the SOC drops.

If the SOC again drops from step 2 of FIG. 7, the SOC correction amount Ps increases further, and the power output Pfc of the fuel cell 110 increases so as to stop the drop in the SOC. For example, as shown in step 3 of FIG. 8, the SOC correction amount Ps increases from 1 kW in step 2 to 2 kW, and a total power output Pfc of 5 kW of the fuel cell 110 is output. Here, 2 kW of the external required power Porq (3 kW) is covered by the power output Pfc of the fuel cell 110, but a power of 1 kW is still insufficient. Therefore, the insufficient 1 kW of power is covered by the output Pbat of 1 kW of the secondary battery 140. Therefore, in the state of step 3 as well, the consumption of the SOC of the secondary battery 140 does not stop, and the SOC drops further.

If the SOC again drops from step 3 of FIG. 8, the SOC correction amount is increases further, and the power output Pfc of the fuel cell 110 increases so as to stop the drop in the SOC. For example, as shown in step 4 of FIG. 8, the SOC correction amount Ps increases from 2 kW in step 3 to 3 kW, and a total power output Pfc of 6 kW of the fuel cell 110 is output. As a result, the entire external required power Porq of 3 kW is covered by the power output Pfc of the fuel cell 110, and the power output of the fuel cell 110 is balanced by the amount of power consumption of the ACP 138, the FC auxiliary machinery 150, the air conditioner 160, and the external power supply section 170. As a result, the output Plat from the secondary battery 140 becomes 0 kW, the consumption of the SOC of the secondary battery 140 stops, and the SOC will be maintained in a constant state. It should be noted that as understood from FIG. 5 explained earlier, if the SOC is fixed, the SOC correction amount Ps is maintained at a constant value according to the SOC.

Hereinafter, as long as the external required power Porq does not change, the state shown in step 4 of FIG. 8 is maintained and the power output of the fuel cell 110 is continued, because of which the electric power of the secondary battery 140 is not consumed, and the external power supply can be continued. Also, if the external required power Porq changes in this state, and the SOC drops, the SOC correction amount Ps increases, the power output Pfc of the fuel cell 110 also increases, the drop in the SOC stops, and the SOC is controlled so as to be maintained at a constant value. On the contrary, if the SOC rises, the SOC correction amount Ps decreases, the power output Pfc of the fuel cell 110 decreases, the rise in the SOC stops, and the SOC is controlled so as to be maintained at a constant value.

During the above-described external power supply in abnormal case, even if a failure occurs in the current sensor 172 for measuring the electric power required for the external power supply, the power output of the fuel cell 110 will be controlled so as to stop the variation in the SOC of the secondary cell 140 while temporarily covering the power by the secondary battery 140. Thus, control is performed in a way that the occurrence of charging or discharging of the secondary battery 140 is reduced, the SOC of the secondary battery 140 is maintained within a permissible range, and at the same time, the power required for the external power supply is covered by the power output from the fuel cell 110, because of which the external power supply can be executed in a continued manner. As a result, the ease of use of the user will be improved. Moreover, since the occurrence of charging or discharging of the secondary battery 140 is reduced, the degradation of the secondary battery will be suppressed, and the life of the secondary battery will be improved.

It should be noted that after starting the external power supply in abnormal case, and setting the external power supply amount Po to 0 kW, the value of the SOC correction amount Ps after adjustment of the SOC of the secondary battery 140 so as to reach a constant value corresponds to the external required power Porq. Thereafter, the amount of change in the SOC correction amount Ps that has changed from the time the SOC changes until the SOC reaches a constant value corresponds to the amount of change in the external required power Porq. Therefore, it is possible to measure the electric power required for the external power supply by using the value of the SOC correction amount Ps instead of the current sensor 172. Thus, for example, the electric power required for the external power supply measured from the SOC correction amount Ps may be set as the external power supply amount Po of the fuel cell 110, and then the SOC correction amount Ps may be reset thereafter.

According to the above-described embodiment, the external power supply section 170 is configured to supply the DC power from the low-voltage DC line DCL to the external power supply apparatus 174, and the external power supply apparatus 174 is configured to convert the DC power supplied from the external power supply section 170 to an AC power of 100 VAC, and then supply the electrical power to the external load connected to the electrical outlet for commercial power supply. However, these are not restricted to the above-described configurations, and the external power supply section 170 may be configured to convert the DC power to an AC power of 100 VAC, etc., and then supply it to the external power supply section 174. Moreover, the external power supply apparatus 174 need not necessarily be connected to an external load through its electrical outlet for commercial power supply.

In the above-described embodiment, the fuel cell vehicle 10 is switched between the normal running mode and the external power supply mode with a operation mode selection switch. However, the operation mode selection switch may be omitted. In such a case, the controller 180 may be switched between the normal running mode and the external power supply mode on the basis of the driving status of the fuel cell vehicle 10 and the connection status of the external load. For example, the controller 180 may be set to automatically shift to the external power supply mode during idling of the fuel cell vehicle 10, or during application of the parking brake when an external load is connected or when the usage of power by the external load starts. Moreover, when the controller 180 is in the external power supply mode, and the parking brake is released and the accelerator pedal is pressed down, the electrical connection of the external load may be disconnected and the controller may be forcibly shifted to the normal running mode. Moreover, in the above-described embodiment, some or all of the functions and processes implemented by software may be implemented by hardware. Also, some or all of the functions and processes implemented by hardware may be implemented by software. Various types of circuitry, such as an integrated circuit, a discrete circuit, or a circuit module that is a combination of these circuits may be used as hardware.

The present invention is not restricted to the above-described embodiments, examples, and modifications, and can be implemented in various configurations as long as the list of the invention is not lost. For example, the technical characteristics described in the embodiments, examples, and modifications corresponding to the technical characteristics in each form described in the summery may be appropriately substituted or combined together in order to resolve some or all of the above-described issues, or to realize some or all of the above-described effects. Moreover, if the technical characteristics are not described as compulsory in the specification, they may be deleted appropriately.

What is claimed is:

1. A control method of an external power supply system configured to supply power to the outside from a fuel cell and a secondary battery mounted on a vehicle, wherein
   when a failure is detected in a sensor that measures an electric power supplied to the outside from an electric power line to which the fuel cell and the secondary battery are connectable,
   (a) if a decrease in a state of charge of the secondary battery is detected, external power supply is performed by increasing a generated power of the fuel cell so as to stop the decrease in the state of charge, and
   (b) if an increase in a state of charge of the secondary battery is detected, external power supply is performed by decreasing the generated power of the fuel cell so as to stop the increase in the state of charge.

2. The control method of an external power supply system according to claim 1, wherein
   when a failure is detected in the sensor, either said (a) or said (b) is executed while assuming a part of the generated power of the fuel cell used for supplying power to the outside to be zero.

3. The control method of an external power supply system according to claim 1, wherein
the generated power of the fuel cell is set as a total of an amount of generated power for supplying power to the outside, an in-vehicle device consumption amount that is consumed by in-vehicle devices, and a correction amount corresponding to the increase or decrease in the state of charge.

4. The control method of an external power supply system according to claim 1, wherein
the power supplied to the outside when a failure is detected in the sensor is restricted to a value determined based on an upper-limit value of charging or discharging power permitted far the secondary battery.

5. An external power supply system configured to supply power to the outside from a fuel cell and a secondary battery mounted on a vehicle, comprising:
an external power supply section for supplying power to the outside from an electric power line to which the fuel cell and the secondary battery are connectable;
a sensor for measuring power supplied to the outside via the external power supply section;
a state-of-charge detector for detecting a value indicating a state of charge of the secondary battery; and
a controller for controlling generation of power of the fuel cell and charging or discharging of the fuel cell, wherein
when the controller detects a failure in the sensor,
(a) if a decrease in a state of charge of the secondary battery is detected, the controller performs external power supply by increasing a generated power of the fuel cell so as to stop the decrease in the state of charge, and
(b) if an increase in a state of charge of the secondary battery is detected, the controller performs external power supply by decreasing the generated power of the fuel cell so as to stop the increase in the state of charge.

6. The external power supply system according to claim 5, wherein
when the controller detects a failure in the sensor, then executes either said (a) or said (b) while assuming a part of the generated power of the fuel cell used for supplying power to the outside to be zero.

7. The external power supply system according to claim 5, wherein
the generated power of the fuel cell is set as a total of an amount of generated power for supplying power to the outside, an in-vehicle device consumption amount that is consumed by in-vehicle devices, and a correction. amount corresponding to the increase or decrease in the state of charge.

8. The external power supply system according to claim 5, wherein
the power supplied to the outside when a failure is detected in the sensor is restricted to a value determined based on an upper-limit value of charging or discharging power permitted for the secondary battery.

\* \* \* \* \*